(12) United States Patent
Jolda et al.

(10) Patent No.: US 9,465,375 B2
(45) Date of Patent: Oct. 11, 2016

(54) SLIDING HARD KEYS

(71) Applicants: Volkswagen AG, Wolfsburg (DE); Audi AG, Ingolstadt (DE)

(72) Inventors: Matthew Jolda, Palo Alto, CA (US); Megan McClain, San Francisco, CA (US); Aaron Rudolph, Montara, CA (US); Stefan Henze, Braunschweig (DE); James Toggweiler, San Francisco, CA (US)

(73) Assignees: Volkswagen AG, Wolfsburg (DE); Audi AG, Ingolstadt (DE)

(*) Notice: Subject to any disclaimer, the term of this patent is extended or adjusted under 35 U.S.C. 154(b) by 184 days.

(21) Appl. No.: 13/852,579

(22) Filed: Mar. 28, 2013

(65) Prior Publication Data

US 2014/0257567 A1 Sep. 11, 2014

Related U.S. Application Data (60) Provisional application No. 61/775,263, filed on Mar. 8, 2013.

(51) Int. Cl.
| | |
|---|---|
| G09G 5/00 | (2006.01) |
| G05B 15/02 | (2006.01) |
| G06F 3/02 | (2006.01) |
| F16H 25/12 | (2006.01) |
| B60K 35/00 | (2006.01) |
| B60K 37/04 | (2006.01) |
| B60K 37/06 | (2006.01) |
| H01H 3/08 | (2006.01) |

(52) U.S. Cl.
CPC ............... *G05B 15/02* (2013.01); *B60K 35/00* (2013.01); *B60K 37/04* (2013.01); *B60K 37/06* (2013.01); *F16H 25/12* (2013.01); *G06F 3/02* (2013.01); *H01H 2003/085* (2013.01); *Y10T 74/18576* (2015.01)

(58) Field of Classification Search
CPC ...... G06F 3/02; G06F 3/04892; G06F 1/169; G06F 1/1643; G06F 3/033; G06F 1/3259; G06F 3/0346; G06F 3/03543; G05B 15/02; G05G 9/047; H01H 13/70; H03K 17/94
USPC ................ 345/156, 160, 161, 184; 700/275; 74/89.23
See application file for complete search history.

(56) References Cited

U.S. PATENT DOCUMENTS

| | | | |
|---|---|---|---|
| 7,499,003 B2 | 3/2009 | Rudolph et al. | |
| 7,830,460 B2 * | 11/2010 | Ido | 348/837 |
| 8,816,995 B2 * | 8/2014 | Geyl | 345/184 |
| 2005/0034965 A1 * | 2/2005 | Uehira | G05G 1/087 200/341 |
| 2007/0138822 A1 | 6/2007 | Feit et al. | |
| 2007/0247420 A1 | 10/2007 | Strohband et al. | |
| 2009/0079712 A1 * | 3/2009 | Levin et al. | 345/184 |
| 2010/0084202 A1 * | 4/2010 | Selin | G06F 3/03545 178/19.01 |
| 2010/0155215 A1 | 6/2010 | Zuo | |

FOREIGN PATENT DOCUMENTS

DE 10 2009 001 412 A1 9/2010

\* cited by examiner

*Primary Examiner* — Jennifer Nguyen
(74) *Attorney, Agent, or Firm* — Muncy, Geissler, Olds & Lowe, P.C.

(57) ABSTRACT

A console includes a display and a plurality of individually-actuatable modules, including a physical key configured to slide into and out of a surface of the console. The modules include a motor, a threaded shaft coupled to and extending from the motor, and a movable platform movably attached to the threaded shaft. The physical key is movably supported on the movable platform.

17 Claims, 10 Drawing Sheets

SLIDING HARD KEYS

This nonprovisional application claims priority to U.S. Provisional Application No. 61/775,263, which was filed on Mar. 8, 2013, and which is herein incorporated by reference.

BACKGROUND OF THE INVENTION

1. Field of the Invention

The present invention relates to console control buttons and more particularly to concealable hard keys for vehicle control consoles.

2. Description of the Background Art

As vehicles become more complex machines, the input needs of the vehicles also become more complex. Modern vehicles present the user with much information via fixed units (e.g., climate control) as well as variable displays (i.e., infotainment head unit, digital instrument cluster display, etc.). This content, whether fixed or variable, requires input devices so that the user can interact with the content. Simple buttons and knobs are currently being used, but are no longer modern enough to be perceived as "premium." In certain vehicles, simple hardware is being made more "premium" simply by adding mechanical motion to it (e.g., tweeters that rise from the dash, display screens that unfold from the dash on car startup, etc.). Often times all of the input hardware is constantly in front of the user even when there is no need for input. Thus, it is desired to remove the input hardware from the view of the user when there is no need for input.

There currently is a need to improve the aesthetics of current hard keys, buttons, and toggle switches. Furthermore, there is a need to replace conventional hard keys, buttons, and toggle switches with improved "smart" hard keys, buttons, and switches (i.e., the hard keys, buttons, and switches understand when they are needed for input and when they are not).

Several conventional devices provide modified hard keys, buttons, or toggle switches that may move, slide or retract during use.

For example, U.S. Patent Application Publication No. 2010/0155215 discloses an input device using sliding buttons. The buttons slide via user input inside a slot on the surface of a device. The sliding motion of the button completes the circuit. Then, the button repositions itself via internal springs.

U.S. Pat. No. 7,499,003 discloses a display, used in ranges, stove tops, and other appliances, in which buttons turn off or disappear entirely after a period of inactivity to avoid cluster from having extra graphics and buttons on the display. The extra graphics and buttons serve a function during operation of the appliance, but are not necessary to be displayed at all times. The disappearing input devices are touch sensitive surfaces, which hide below a piece of tinted black glass. When an input is needed, the button lights up beneath the glass via an LED, and the input surface becomes active. Similarly, graphics can also be lit up via an LED beneath the surface for feedback purposes. When the system times-out, all of the LEDs and touch zones turn off and the result is a clean black glass surface.

U.S. Patent Application Publication No. 2007/0138822 is directed to an automotive display unit, which mechanically moves to hide and reveal itself to the user. The moving display can include a control panel, which moves with the display unit. The control panel is synched in an opening/closing position with the physical display, as well as being used to control various elements on the display when it is visible. When the display is not being used, it can be stored away mechanically with this control panel, resulting in a clean surface where the display and buttons once were.

U.S. Patent Application Publication No. 20070247420 is directed to an automobile display and control unit in which the physical hard keys are replaced with surface zones that can be either active or inactive. These zones appear flat when inactive and do not register any input. When input is needed from a specific button, the zone becomes active and creates a tactile protrusion from the surface, which registers a button push when pressed. The protrusion is created via shape memory alloy actuators embedded in the surface.

None of the conventional techniques, however, provide a device or method for concealing physical buttons while the display associated with the buttons and the surrounding area remains stationary.

SUMMARY OF THE INVENTION

In view of the foregoing and other exemplary problems, drawbacks, and disadvantages of the conventional methods and structures, an exemplary feature of the present invention is to provide concealable physical buttons while the display associated with the buttons and the surrounding area remain stationary.

In accordance with a first exemplary, non-limiting aspect of the present invention, a console includes a display and a plurality of individually-actuatable modules including a hard key configured to slide into and out of a surface of the console.

In accordance with a second exemplary, non-limiting aspect of the present invention, a module includes a motor, a threaded shaft coupled to and extending from the motor, a movable platform movably attached to the threaded shaft, and a hard key movably supported on the movable platform.

In accordance with a third exemplary, non-limiting aspect of the present invention, a console includes a display and a module. The module includes a motor, a threaded shaft coupled to and extending from the motor, a movable platform movably attached to the threaded shaft, and a hard key movably supported on the movable platform. The hard key is configured to slide into and out of a surface of the console.

A feature of the present invention combines the typically passive elements of a control console with mechanical motion to create a button that disappears when no input context is needed and appears when there is a need to use it. That is, a unique feature of the present invention is that the buttons completely conceal themselves when not needed for interaction. This is achieved by physically retracting the mechanical button (e.g., the entire mechanical button) until it is flush with the surface. The operation is achieved with linear actuation. LEDs are not used to create or destroy buttons and the button itself does not change shape in anyway. The buttons are also configured to move independent of the display showing the associated graphics, allowing different button configurations to be used with different combinations of graphics on the display.

When not interacting with a device/area, many or all of the hard keys can be concealed. Upon entering an interaction mode where the buttons are needed, they appear by mechanically moving out of the surface of the console. The buttons may be tied to the interaction concept in any number of ways. The buttons may all be actuated together so they appear/disappear at once or they can be actuated in stages so that as the user interaction grows in complexity, the number of buttons available for the user parallels this. Furthermore, because only the buttons move, not the surrounding surface or associated display, their movement can be synchronized with those of the graphics on the display. This creates an effect that emphasizes the connection between the physical buttons and the graphics to which they are related.

By creating hard keys that mechanically slide into and out of a surface, the interaction is both as simple as possible and tailored to the given interaction mode. The elimination of excess buttons creates a more intuitive interface that looks uncluttered, clean and aesthetic. The presentation of hard keys rather than touch screen or shape-changing alloy buttons beneath the surface creates more pleasing and informative haptic feedback. The button can be designed to feel exactly as the haptics demand, without having to sacrifice due to the properties of the complex material used. Furthermore, the actuation of buttons independent of the display allows the button layout to change in relation to the mode of interaction and more buttons can appear/disappear as the interaction becomes more or less complex.

There is no conventional technology that implements the above features whereby physical buttons appear when necessary and retract back into a surface while the display associated with them and the surrounding area remains stationary.

BRIEF DESCRIPTION OF THE DRAWINGS

The present invention will become more fully understood from the detailed description given hereinbelow and the accompanying drawings which are given by way of illustration only, and thus, do not limit the present invention, and wherein.

DETAILED DESCRIPTION

Referring now to the drawings, and more particularly to FIGS. 1-9, there are shown exemplary embodiments of the method and structures according to the present invention.

An exemplary aspect of the invention provides an individually-actuated electro-mechanical module that creates a hard key that is configured to slide into and out of a surface. The module is designed such that it is able to provide controllable motion, light, and haptic feedback during use. The module topology is highly scalable through the communication protocol (e.g., controller area network (CAN)) used and is also customizable for different hard key shapes and designs.

Figure 1:
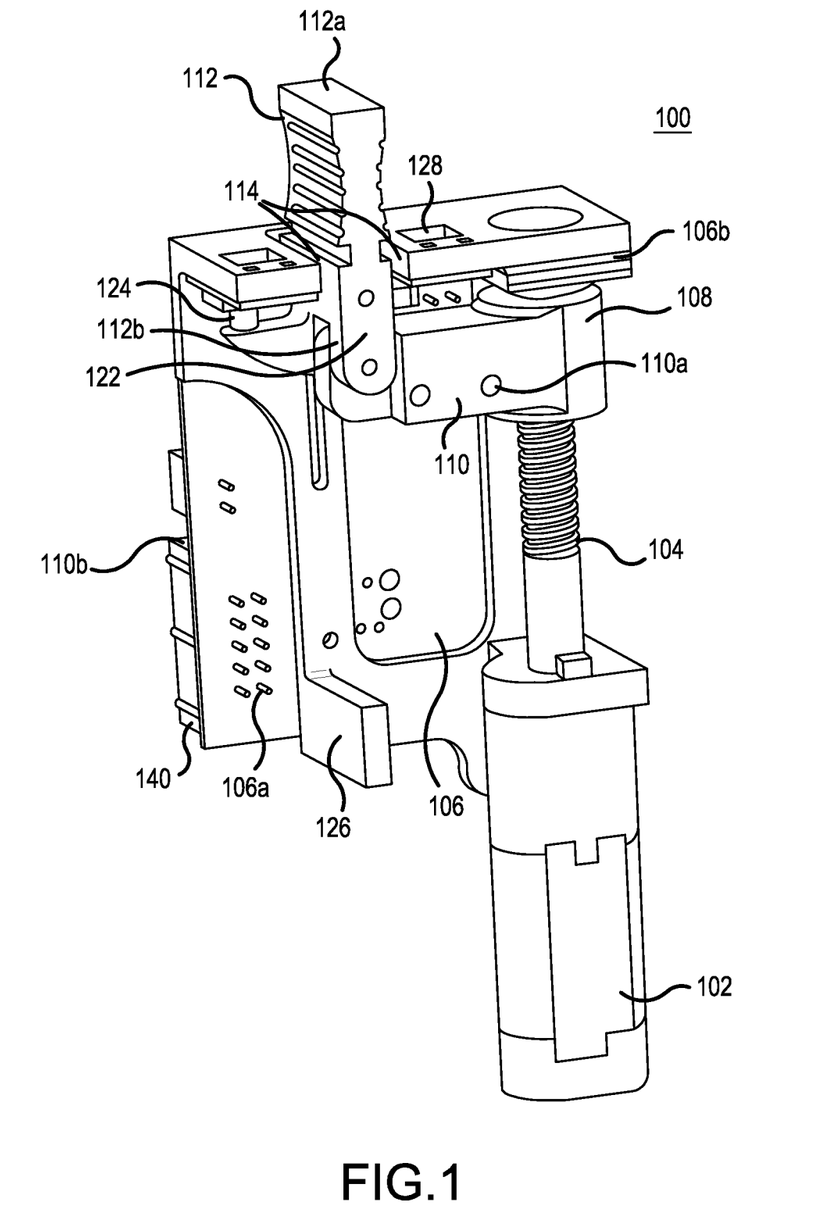
FIG. 1 illustrates cut-away view of a module 100 according to an exemplary embodiment of the present invention.

FIG. 1 illustrates a mechanical assembly of a module 100 according to an exemplary embodiment of the present invention. The module 100 includes a motor 102 configured to provide mechanical actuation of the module 100. In the exemplary embodiment illustrated in FIG. 1, the motor 102 includes a geared DC motor. The motor 102 is coupled to a threaded shaft 104. In the exemplary embodiment illustrated in FIG. 1, the threaded shaft 104 includes a trapezoidal thread (e.g., an Acme thread). Furthermore, the motor 102 is mounted on a support frame 106. The support frame 106 has a lower main body portion 106a and an upper portion 106b, which is disposed substantially perpendicular to the lower portion 106a. The threaded shaft 104 extends from the motor 102 to the upper portion 106b of the support frame 106.

The threaded shaft 104 extends through a fastener. In the embodiment illustrated in FIG. 1, the fastener includes a captive nut 108. The captive nut 108 is threadably engaged with the threaded shaft 104 such that the captive nut 108 is configured to move vertically along the thread shaft 104 as the threaded shaft 104 is rotated by the motor 102.

A traversable platform 110 is mounted on the captive nut 108. It is noted that the platform 110 and the captive nut 108 may be separate components or a single integral unit. The platform 110 is mounted to the captive nut 108 at a first end 110a of the platform 110. The platform 110 is configured to be movable vertically along the threaded shaft 104 with the vertical movement of the captive nut 108.

Figure 2:
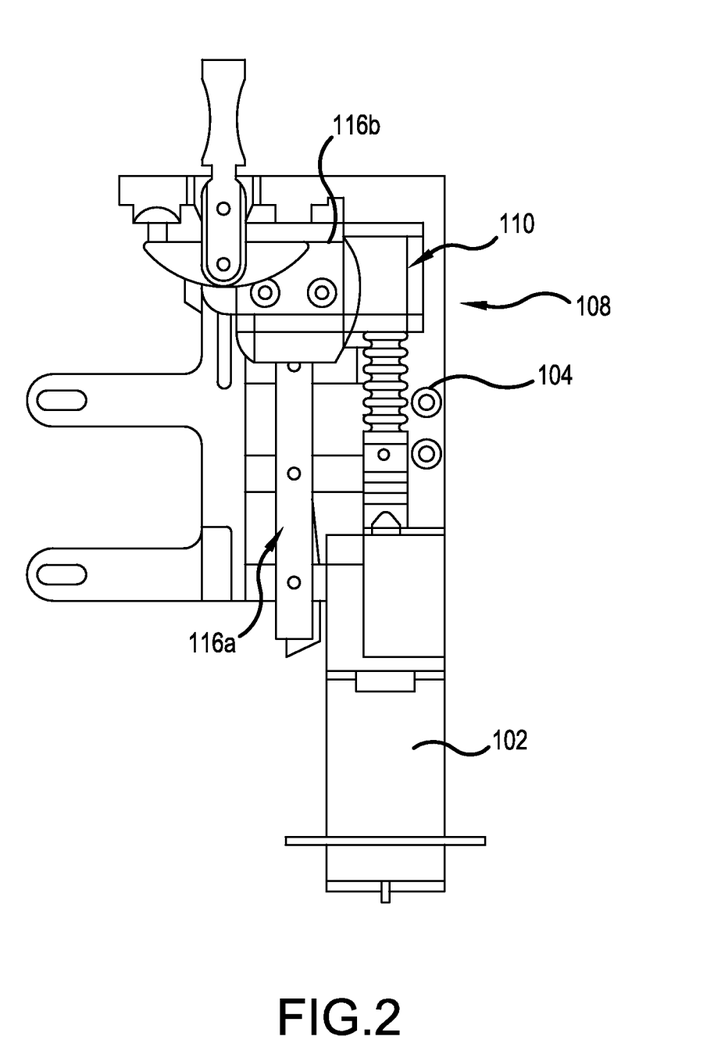
FIG. 2 illustrates the linear slide of the module illustrated in FIG. 1.

FIG. 2 further illustrates the module 100. As is illustrated in FIG. 2, the module includes a linear slide 116, which further supports the platform 110. The linear slide 116 provides smooth movement of the platform 110. The linear slide 116 consists of a vertical, stationary portion 116a and a piece that can slide freely along the length of this portion 116b. The interface between these two parts has very little friction. The linear slide serves to restrict the motion of the platform 110 to the vertical axis and allows smooth, almost frictionless movement. Here the linear slide moving piece 116b is attached to the platform 110 near the platform's center and the platform is driven up and down by the motor 102. The connection between the motor and the platform 110 is achieved via a captive nut 108 and threaded shaft 104.

A hard key is coupled to the platform 110 at a second, opposing end 110b of the platform 110. In the exemplary embodiment illustrated in FIG. 1, the hard key includes a physical toggle switch 112. The toggle switch 112 is disposed such that it is able to extend through an opening 114 in the upper portion 106b of the support frame 106. As the toggle switch 112 is mounted to the platform, the toggle switch 112 is configured to move vertically along with the movement of the platform 110 and the captive nut 108.

Figure 3:
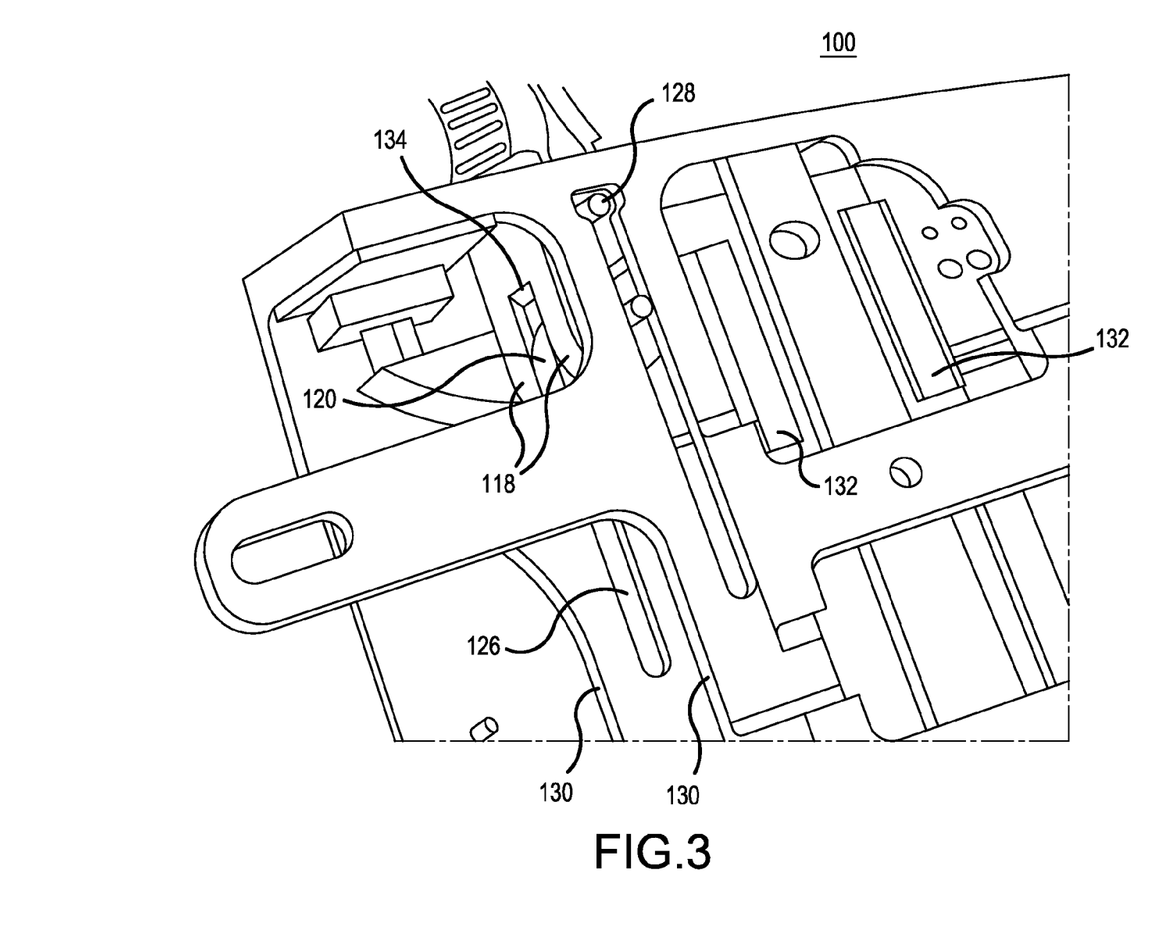
FIG. 3 illustrates a partial view of an interior portion of the module 100 illustrated in FIG. 1.

The toggle switch 112 has an upper end 112a and a lower end 112b. As is illustrated in FIG. 3, the lower end 112b has two separated mounting portions 118 and a receiving slot 120 disposed between the two mounting portions. The receiving slot 120 is configured to receive a portion of the second end 110b of the platform 110. Referring again to FIG. 2, the lower end 112b of the toggle switch 112 has an upper hole 124 and a lower hole 122, both of which extend through the lower end 112b of the toggle switch 112. The lower hole 122 is disposed such that it extends through each of the mounting portions 118. A mounting pin 126 extends through the lower hole 122 and through the mounting portions 118 and through the second end 110b of the platform 110. Similarly, an adjustment pin 128 extends through the upper hole 122.

As is illustrated in FIG. 3, the lower portion 106b of the support frame 106 includes two separated main body members 130. The main body members 130 are secured to and separated by the upper portion 106b of the support frame 106. The upper portion 106b and the main body portions 130 may be constituted as separate components secured together or as a single integral component forming the support frame 106.

A track 132 is disposed in each of the main body members 130. The tracks 132 are vertically disposed along the main body members 130 of the support frame 106 and are disposed parallel to one another. Additionally, the tracks 132 are aligned opposite one another (e.g., directly opposed across from each other). The tracks 132 are configured to slidably receive the mounting pin 126 and the adjustment pin 128. That is, one end of each pin engages one of the tracks 132 and another opposite end of each pin engages the other of the tracks 132. The toggle switch 112 is therefore constrained by the track and pin combination such that the toggle switch is constrained to be held in a vertical position during the vertical translation.

A slot 134 is disposed at the top of each track 132. When the adjustment pin 124 is received within the slot 134, the constraint on movement is removed and the toggle switch 112 is allowed to toggle. That is, when the toggle switch 112 is moved vertically to a position such that the toggle switch 112 extends through the hole 114, the toggle switch 112 is able to be toggled. The mounting pin 122 acts as a toggle hinge point.

Figure 4:
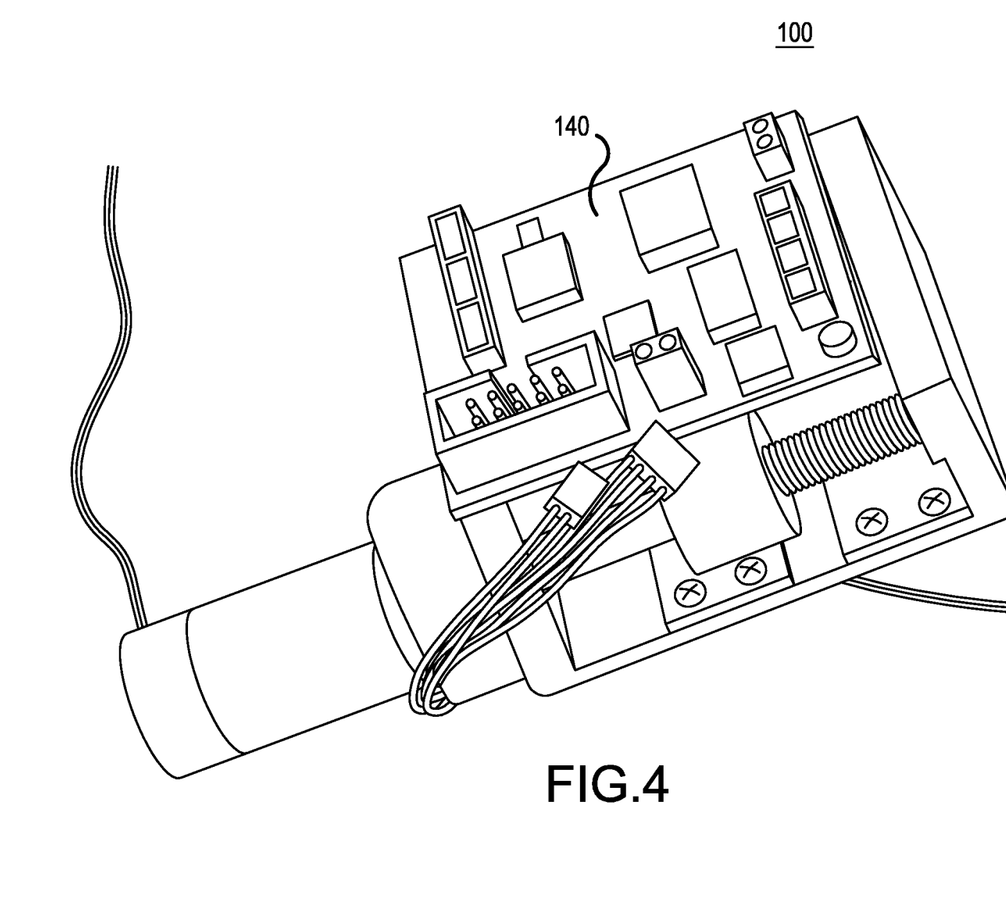
FIG. 4 illustrates an electronic control unit 140 component of the module 100 illustrated in FIG. 1.

The motor module 100 further includes a dedicated electronic control unit (ECU) 140. FIG. 4 specifically illustrates a module 100 including the ECU according to an exemplary embodiment of the present invention. The ECU 140 is configured to provide motor control, provide light control for backlit icons, read the status of connected switches, and provide CAN networking capabilities.

Figure 5:
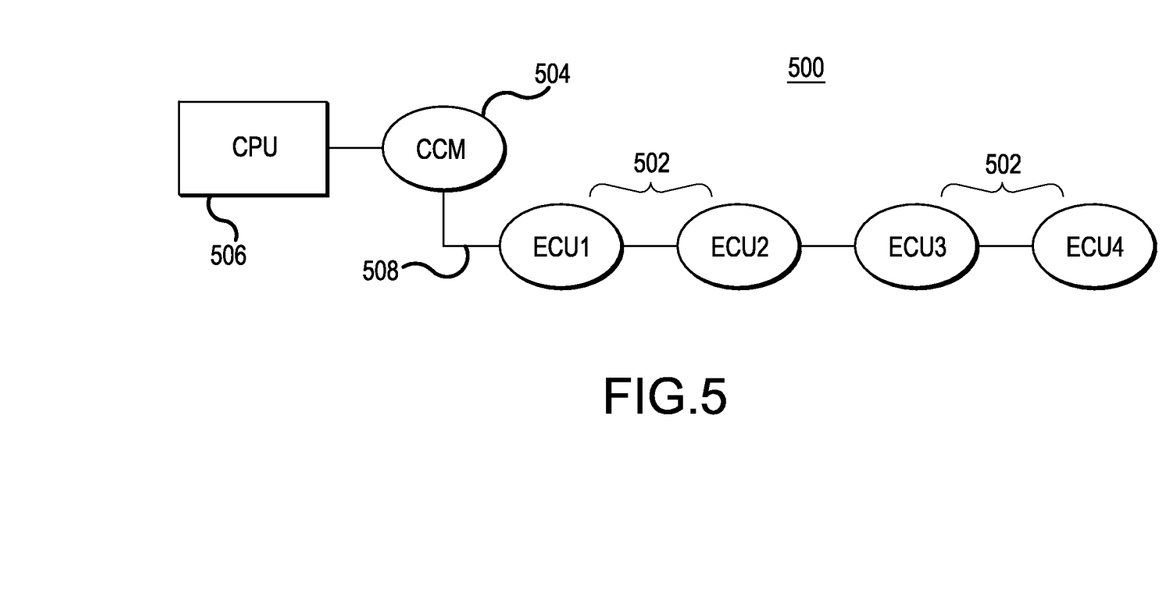
FIG. 5 illustrates a system 500 according to an exemplary embodiment of the present invention.

In certain exemplary embodiments, more than one module 100 will be used. That is, a control console in a vehicle may have more than one button/toggle switch. Accordingly, the console will employ a plurality of modules 100. FIG. 5 illustrates a control area network (CAN) system 500 according to certain exemplary embodiments of the present invention. The ECU of each module 502 is connected to a private CAN bus 508, which exists between the modules 502 and a central control module (CCM) 504. The CCM includes a processor and storage device configured to store current states of the buttons and to return information to a vehicle's host computer/processor 506 over a universal serial bus (USB) when queried. Additionally, the CCM 504 is responsible for receiving commands from the connected computer/processor 506 over the USB and translating these messages into CAN messages that are then broadcoast to each of the modules 502. As is illustrated in FIG. 5, the modules 502 and the CCM 504 are connected in a standard bus network topology.

Figure 6A:
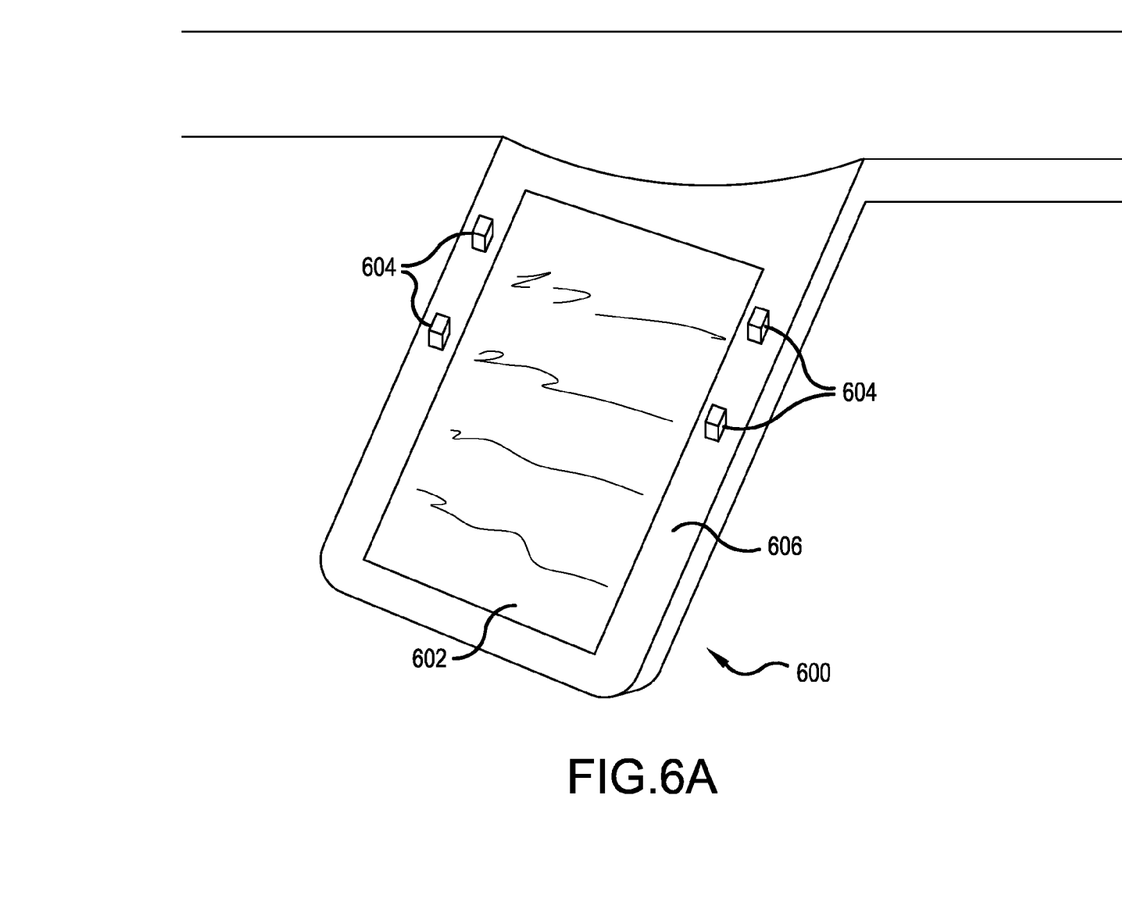
FIGS. 6A and 6B illustrate a console 600 according to an exemplary embodiment of the present invention.
Figure 6B:
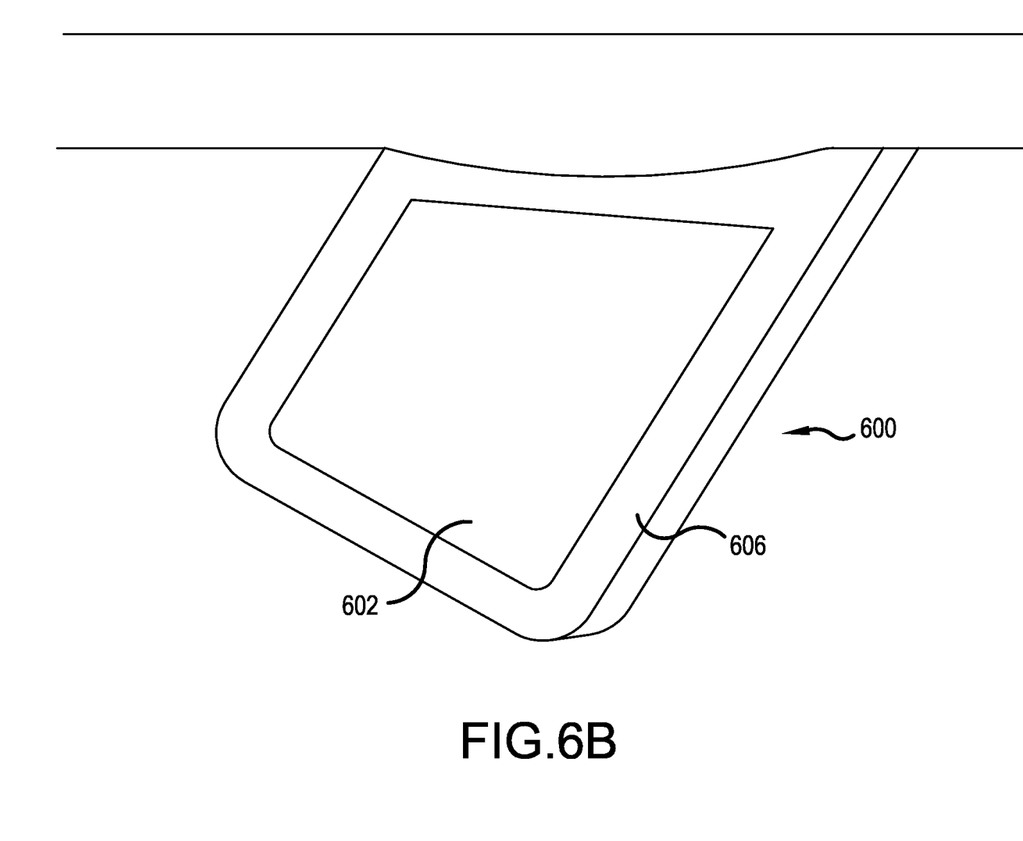

FIGS. 6A and 6B illustrate hardware for a control console incorporating the modules 100 according to an exemplary embodiment of the present invention. The control console 600 includes a display screen 602 and a plurality of sliding buttons/hard keys 604. In the exemplary embodiment illustrated in FIGS. 6A and 6B, the console 600 includes four sliding buttons/hard keys 604. It is noted, however, that any suitable number of buttons 604 may be used depending on the needs of the particular vehicle system. The console 600 may be used to control any vehicle system function/operation including, but not limited to, climate control, fan speed, temperature, navigation system inputs, music playback, video playback, etc.

FIG. 6A illustrates a situation in which the console 600 is in an interaction mode. When the software on the display screen 602 is activated, the buttons 604 are controlled to raise through the surface 606 of the console and become activated. The buttons 604 are automatically raised by the system once the software is displayed on the display screen. Once the buttons 604 are raised, they are activated for user interaction. When the software on the screen 602 is removed or prompted to close, the buttons 604 are recessed (e.g., automatically) back through surface, as illustrated in FIG. 6B. The buttons are retractable until flush with the surface 606 of the console 600. Specifically, the buttons are retracted until a top surface of the button is flush with the outer surface 606 of the console 600. In other words, the buttons are concealed (e.g., entirely concealed) within the console. Accordingly, the surface of the console appears as a flat, plain piece of glass, as is illustrated in FIG. 6B. The buttons 604 are no longer interactive in the recessed position. While the buttons 604 move between the retracted and raised positions, the console 600, display screen 602 and the surface 606 remain in a fixed position. That is, the position, arrangement, and configuration, etc., of the console 600, display screen 602 and the surface 606 remains unchanged.

According to another aspect to the invention, the display screen may be separated into one or more interaction zones. The software on the display screen 602 may be activated in only one of the zones (i.e., less than an entirety of the display screen is activated). Accordingly, only the buttons associated with the activated portion of the display screen with be raised and activated for interaction.

Figure 7:
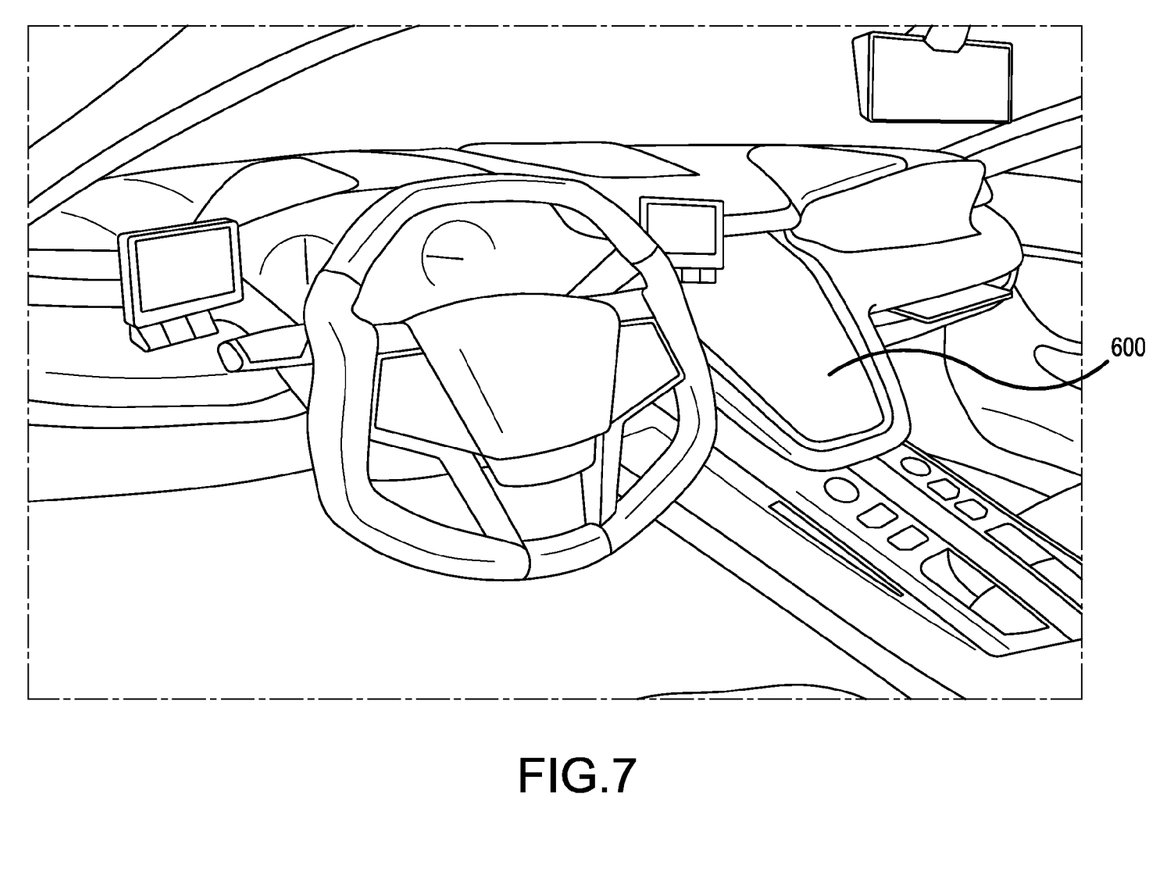
FIG. 7 illustrates a vehicle passenger compartment incorporating the console 600 illustrated in FIGS. 6A and 6B.

FIG. 7 illustrates the console 600 embodied within a vehicle dashboard unit. The system, console and modules of the present invention may be applied to any switch inside the vehicle controlling a single or toggle input. For example, such replaceable switches could include the window controls, fuel door, trunk control, etc.

Figure 8:
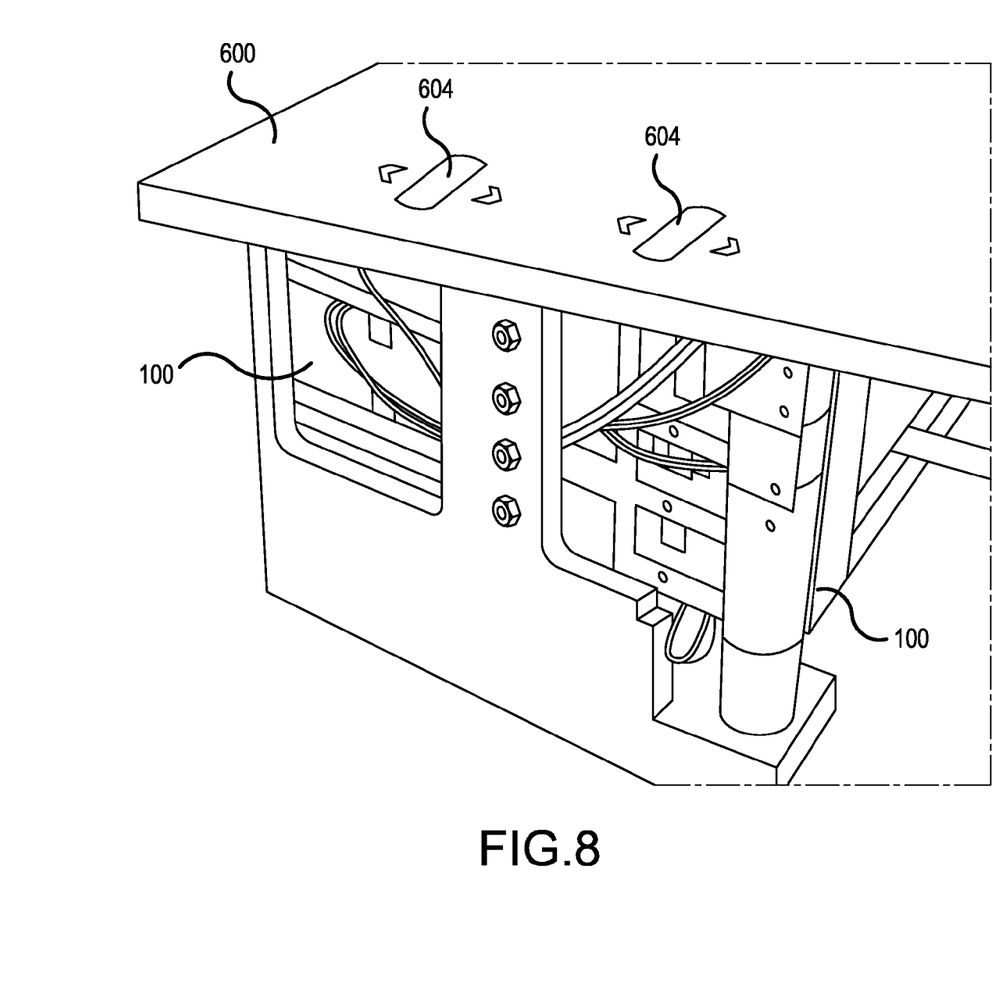
FIG. 8 illustrates the console 600 illustrated in FIGS. 6A and 6B.

FIG. 8 illustrates a cut-away view of the console 600 illustrating a plurality of modules 100 connected within the console 600. It is illustrated that each button 604 is associated with its own module 100.

Figure 9:
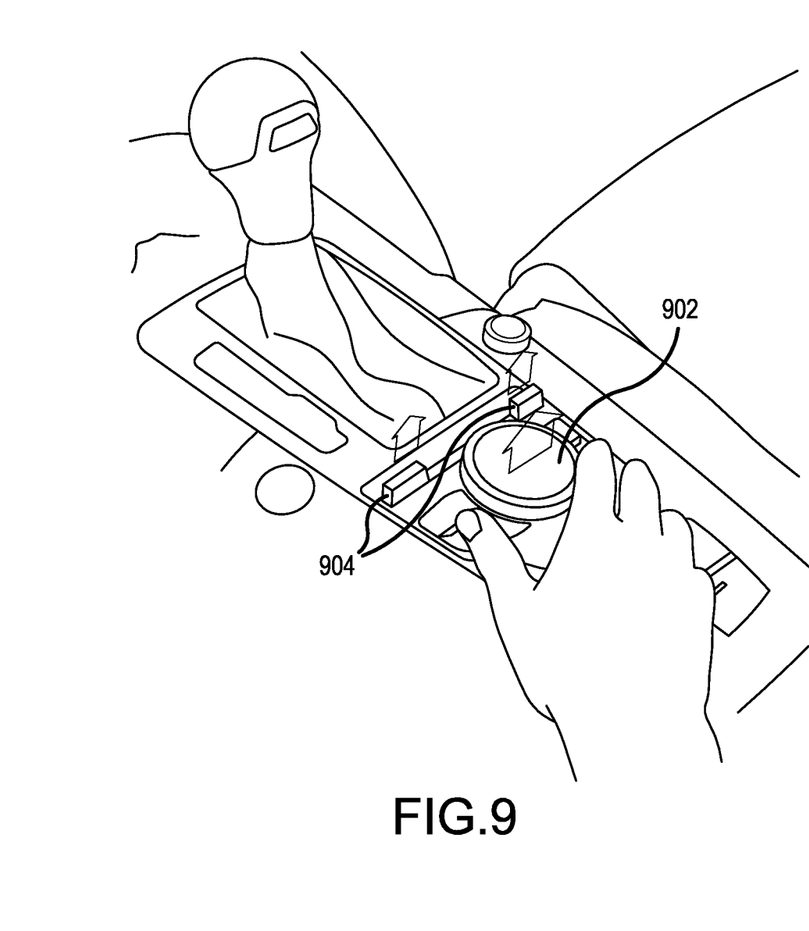
FIG. 9 illustrates an alternate embodiment of the present invention.

FIG. 9 illustrates another embodiment incorporating the modules of the present invention. The embodiment illustrated in FIG. 9 includes a multimedia input (MMI) toggle knob 902 and buttons surrounding the knob 902. The buttons 904 may be configured to automatically raise from the surface when the vehicle is powered or, using proximity sensing, when the user has reached for the MMI knob 902.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. A module, comprising:
a motor;
a threaded shaft coupled to and extending from the motor;
a movable platform movably attached to the threaded shaft;
a fastener configured to attach the movable platform to the threaded shaft, the threaded shaft being threadably engaged with the fastener; and
a hard key movably supported on the movable platform, wherein the hard key is movable through an opening in the module with vertical movement of the movable platform, and
wherein the hard key is connected directly to the movable platform.
2. The module according to claim 1, wherein the motor and the threaded shaft are supported by a support frame.

3. The module according to claim 1, wherein the fastener comprises a captive nut and the threaded shaft extends trough the captive nut.

4. The module according to claim 1, wherein the hard key comprises a retractable toggle switch.

5. The module according to claim 4, further comprising a support frame, the support frame having a track disposed thereon,
wherein the retractable toggle switch comprises a pin configured to engage the track.

6. The module according to claim 5, wherein the track comprises:
an elongate main body portion have a width; and
a slot formed at an end of the elongate main body, the slot having a width greater than that of the elongate main body.

7. The module according to claim 1, wherein the movable platform is configured to move vertically along the threaded shaft in accordance with a rotational movement of the threaded shaft.

8. The module according to claim 1, wherein the fastener comprises a captive nut mounting the movable platform to the threaded shaft.

9. The module according claim 8, wherein the movable platform moves vertically along the threaded shaft with vertical movement of the captive nut.

10. The module according to claim 1, further comprising a linear slide configured to restrict movement of the movable platform to a vertical axis.

11. The module according to claim 1, wherein the hard key extends through an opening in an upper surface of the support frame.

12. The module according to claim 1, wherein a lower end of the hard key comprises two separated mounting portions and a slot disposed between the mounting portions, the slot receiving a portion of the movable platform.

13. The module according to claim 1, wherein the hard key is configured to move from an exposed position extending above a top surface of the module to a lowered position with vertical movement of the movable platform.

14. A module, comprising:
a motor;
a threaded shaft coupled to and extending from the motor;
a movable platform movably attached to the threaded shaft; and
a hard key movably supported on the movable platform,
wherein the hard key is movable through an opening in the module with vertical movement of the movable platform,
wherein the hard key is connected directly to the movable platform,
wherein the motor and the threaded shaft are supported by a support frame, and
wherein the support frame comprises:
an upper main body portion; and
a lower main body portion extending from the upper main body portion,
the lower main body portion comprising:
a pair of spaced main body members attached to the upper main body portion; and
a track disposed on the pair of main body member.

15. A module, comprising:
a motor;
a threaded shaft coupled to and extending from the motor;
a movable platform movably attached to the threaded shaft; and
a hard key movably supported on the movable platform,
wherein the hard key is movable through an opening in the module with vertical movement of the movable platform,
wherein the hard key is connected directly to the movable platform, and
wherein the hard key comprises a lower end pivotably secured to the movable platform.

16. A module, comprising:
a motor;
a threaded shaft coupled to and extending from the motor;
a movable platform movably attached to the threaded shaft;
a fastener configured to attach the movable platform to the threaded shaft, the threaded shaft being threadably engaged with the fastener; and
a hard key comprising a lower end pivotably secured to the movable platform, wherein the hard key is movable through an opening in the module with vertical movement of the movable platform.

17. A module, comprising:
a motor;
a threaded shaft coupled to and extending from the motor;
a movable platform movably attached to the threaded shaft; and
a hard key movably supported on the movable platform,
wherein the hard key is movable through an opening in the module with vertical movement of the movable platform,
wherein the hard key is connected directly to the movable platform, and
wherein the threaded shaft is coupled directly to and extending from the motor.

* * * * *